Nov. 20, 1934.    P. SUBKOW    1,981,477
METHOD AND APPARATUS FOR GAS-LIFT CONTROL
Filed Feb. 5, 1932
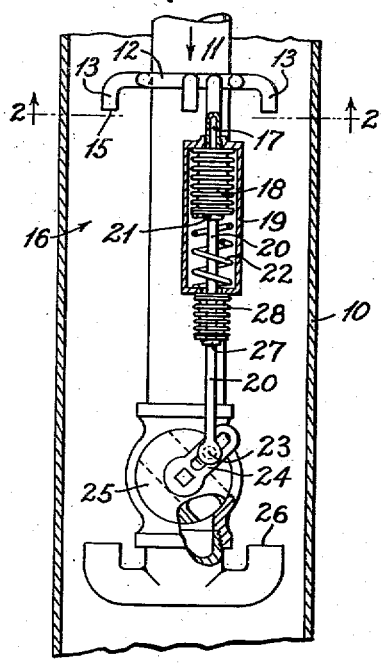
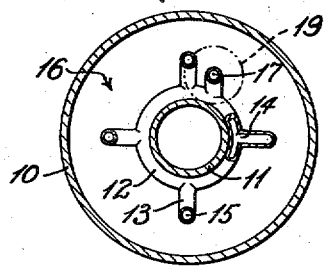
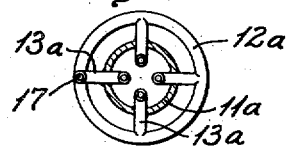
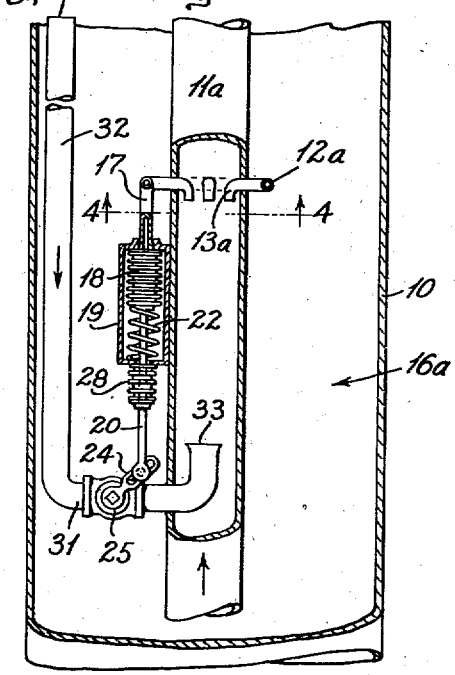
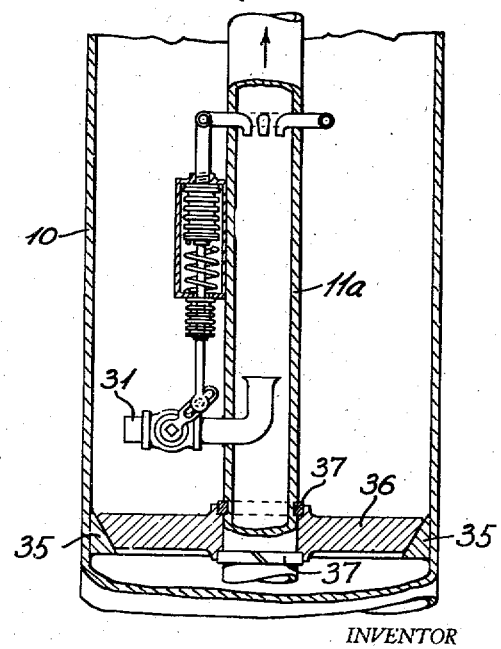
INVENTOR
Philip Subkow Patented Nov. 20, 1934

1,981,477

UNITED STATES PATENT OFFICE

1,981,477

METHOD AND APPARATUS FOR GAS-LIFT CONTROL

Philip Subkow, Los Angeles, Calif., assignor to Union Oil Company of California, Los Angeles, Calif., a corporation of California Application February 5, 1932, Serial No. 591,099

15 Claims. (Cl. 103—232)

This invention relates to the regulation of gas introduction in the so-called "gas-lift" method of flowing deep wells, particularly oil wells, and the invention is an improvement on the co-pending applications, Serial Nos. 455,912 and 455,914, now Patents No. 1,907,608 and No. 1,856,892, respectively.

Gas-lift, as now practiced, consists in passing gas under pressure into a well containing a flow tube so that the gas passes in a stream into the flow tube adjacent its lower end, and in its passage atomizes the oil entering into said flow tube, the atomized oil being carried to the surface in said gas stream. The gas may be introduced either through the flow tube or through the casing, the atomized oil being discharged from the other of the two. The function of the gas is to elevate the oil in the flow tube and the amount of introduced gas necessary for the elevation of the oil is roughly proportional to the weight of the column of fluid in the flow tube.

The present invention has for its general object the automatic regulation of the introduction of gas under pressure into the flow tube in proportion to the rate of flow of oil into the tube, thus maintaining a constant and desired gas-oil ratio in said flow tube. The term "gas-oil ratio" as used throughout this case may be defined as the ratio between the volume of gas used and the volume of oil discharged thereby. Another object of the invention is the regulation of the introduction of gas under pressure with respect to changes in density or specific gravity of the liquid entering said flow tube.

Very briefly stated these objects have been attained by relying upon both static and dynamic pressures in the flow tube, as hereinafter more fully described, a pressure sensitive device being provided in the lower end of the flow tube and opening against the stream, i. e. toward the direction from which the mixed gas and oil stream flows.

As pointed out in the above mentioned applications, the static pressure produced in the tubing of a well flowing by gas-lift may vary in response to varying proportions of gas and oil held in said tubing, or in response to changes in total density or specific gravity of the fluid mixture, or assuming a constant rate of oil introduction, in response to changes in the rate of introduction of gas into said tubing. Variations in static pressure may also be produced by combinations of the above causes, or by other causes. Since an increase in the static pressure in the flow tube, assuming a uniform gravity of oil flowing into said flow tube, means that there is more oil per unit volume of gas therein, a greater volume of gas is required to elevate this oil and to prevent retardation and possible cessation of flow of fluid to the surface. Inversely, a decrease in the static head, again assuming a constant oil gravity, means less oil in the flow tube, requiring less gas to elevate it, and, if gas introduction is not reduced, a waste of gas energy results from the unnecessary blowing of the gas through said flow tube.

The maintenance of a constant gas-oil ratio of the fluid mixture flowing from a well is of great importance in that it insures most efficient oil recovery as well as economic saving in gas energy. The control of gas may be made either at the surface (as described in my Patent No. 1,907,-608), or preferably at or near the point of introduction of gas into the eduction pipe (as disclosed in Patent No. 1,856,892). The reason for gas regulation at a point near its introduction into the fluid eduction pipe is to avoid a time lag in the regulation caused by the buffer effect of the large gas volume in the casing.

However, it has been found that the use of a regulating device actuated by and responsive only to the static pressure in the fluid eduction pipe does not produce sufficiently accurate results. Thus, when a well is flowing a fluid of a substantially constant density, a slug of liquid of a higher or lower density entering into said fluid eduction pipe will not materially change the static pressure, because the latter is equal to the total weight of the fluid in the eduction pipe divided by the cross sectional area of said pipe, plus the friction caused by the passage of the fluid through the pipe. As an example, in a well flowing from a depth of about 4000 feet at the rate of 500 barrels per day and operating with a gas-oil ratio equal to 2500 and with a casing pressure of about 400 pounds per square inch, the inflow of a two-foot slug of pure oil into the fluid eduction pipe increases the static pressure by less than one pound per square inch. The ordinary well instrument is not sufficiently sensitive to such small changes. Therefore, if it were desired to regulate the gas introduction in response only to such changes in static pressure, it would be necessary to use devices which were highly sensitive; but these would be too delicate for oil well operations. Furthermore, it is not always efficient to operate under a constant gas-oil ratio. Thus, when the specific gravity of the liquid entering into the lower end of a fluid eduction pipe suddenly increases, for example due to the entrance of a slug of heavier oil, water or sand into the lower portion of the fluid eduction pipe, it is necessary to increase temporarily the gas-oil ratio in said pipe to prevent retardation or possible cessation of flow. Therefore, the disadvantages of using a gas regulating device responsive only to the static pressure in the eduction pipe may be summarized as: (1) the undesirable requirement of a very sensitive device, and (2) the inability to prevent retardation of flow when a large slug of heavier liquid enters the eduction pipe.

Now, I have found that greater sensitivity and accuracy of regulation may be obtained by controlling the introduction of gas into the fluid eduction pipe in response to both static and dynamic pressures. The dynamic pressure or kinetic energy generated in a fluid eduction pipe is equal, per unit quantity of fluid, to the density of the fluid multiplied by the square of the velocity of said fluid and divided by twice the rate of acceleration due to gravity, or $$P = \frac{v^2 d}{2g}.$$

The dynamic pressure may also be stated as being equal to the mass of fluid multiplied by one-half the square of the velocity of said fluid, or $P = \frac{1}{2}mv^2$. For this second equation the measure of the mass (which is a function of the density of the fluid) is taken on the high pressure or under side of a measuring device located in the eduction pipe, that is on the side toward the direction from which the gas-oil stream comes, and not from the low pressure side beyond the device as in the case of determining the static pressure. Since a change in the density of the fluid passing through the fluid eduction pipe changes the dynamic pressure and since such a change in dynamic pressure is of greater magnitude than the corresponding change in static pressure (as is obvious from the character of the above equation) such changes may be taken advantage of for purpose of prompt regulation, by using a device responsive to dynamic pressure changes. Thus, in the above example where the static pressure increased less than one pound per square inch, the dynamic pressure increased by more than 15 to 20 pounds per square inch. Again, when a slug of heavier liquid enters the flow tube the dynamic pressure changes immediately due to the change in mass, and the gas-oil ratio may be promptly increased thereby to prevent retardation of flow, whereas the static pressure is not affected materially until a substantial portion of the fluid in the flow tube is replaced by said heavier liquid.

Therefore, a further object of the invention is to provide a method and means to maintain a constant gas-oil ratio as long as the density of the inflowing liquid remains substantially the same, and to vary said gas-oil ratio in response to changes in density of the liquid. Or, stated otherwise, this object is to regulate the flow of gas under pressure into the flow tube in response to changes in the amount and specific gravity of the liquid flowing through said tube. Such regulation will take place even where quantities of water or other foreign matter enter the flow tube.

The above and other objects are attained by providing at or near the bottom of the eduction tube a regulating means constantly responsive both to the static pressure of the mixture of oil and gas rising in the tube and to the dynamic pressure of the mixture passing by said regulating means, such means being operative to regulate automatically the introduction of gas under pressure into said eduction tube in proportion to the variations in both static and dynamic pressures. Thus, constant and prompt regulation of the volume of gas under pressure introduced into the flow tube in relation to the amount and character of oil and gas flowing through it will be obtained.

Briefly stated, the invention may therefore be said to reside broadly in a method, and in a device with which to carry on such a method, for regulating the flow of gas under pressure into the flow tube in proportion to variations in the total pressure in said flow tube, said total pressure being the sum of the static and dynamic pressures. The invention further resides in a method and means for maintaining a constant gas-oil ratio in a flow tube of a well operating by gas lift as long as the density of the liquid entering said flow tube remains substantially constant and for changing said gas-oil ratio in response to changes in density, which method comprises employing both the static and dynamic pressures of the mixture in the flow tube to regulate the introduction of gas directly into the lower portion of said flow tube in relation and in proportion to the total pressure.

The invention further comprises means associated with a flow tube and responsive to both the static and dynamic pressures, in combination with means controlled by the responsive means to regulate the inflow of gas into said flow tube in response to variations in either or both the static head and dynamic pressure. More particularly stated, the invention comprises one or more Pitot tubes installed adjacent the lower end of the flow tube and opening downward therein, said Pitot tubes transmitting both the variations in the static head in the flow tube and the variations in the dynamic pressure at said Pitot tubes, a gas-supply valve opening from the well casing into the flow tube, and means operatively connected to the Pitot tubes to operate the valve in response to the changes in the combined static head and dynamic pressure.

The term "Pitot tube" as used throughout this case is to be understood to mean a device which automatically and constantly measures and transmits both the static head of the fluid above it in the fluid eduction pipe or tubing and the dynamic pressure in said pipe or tubing at the point where the device opens thereinto. In the preferred form of construction I prefer to use a plurality of Pitot tubes which open into the eduction pipe and point downward into the up-coming stream and which also open into a narrow airtight annular tube encircling the pipe, said annular tube communicating with a sylphon bellows or the like capable of imparting motion to the gas valve upon changes in pressure. By the term "sylphon bellows" I mean a resilient metallic bellows expansible and contractible in response to pressure changes exerted thereon. It is used herein to transmit changes in total pressure or head. It will be apparent to those skilled in the art that any other pressure transmitting agency, such as a diaphragm or movable piston, may be used in its stead. Also, other devices, such as a Venturi tube, may be used instead of a Pitot tube to measure the total pressure in the flow pipe.

The invention will be better understood by reference to the accompanying drawing which illustrates different embodiments, and wherein Fig. 1 is an elevation partly in vertical section showing a controlling device positioned in a well adjacent the lower end of a gas induction pipe for constantly controlling gas flow into the fluid eduction pipe;

Fig. 2 is a section along line 2—2 of Fig. 1;

Fig. 3 indicates a similar type of a device mounted on the lower portion of a flow tube depending in a well casing;

Fig. 4 is a section along line 4—4 of Fig. 3; and

Fig. 5 shows another modification in which the annular space between the flow tube and well casing is packed below the gas inlet to the flow tube.

In the form shown in Figs. 1 and 2, the gas controlling device is positioned within a well casing 10 and is attached to the lower end of a depending gas induction pipe 11. An annular ring 12 fixed on the outside of said induction pipe 11 is provided with a plurality of Pitot tubes 13 opening thereinto at 14. The opposite ends 15 of said tubes 13 open into the annular oil space 16 between the gas induction pipe 11 and the well casing 10, and point downward against the stream therein to measure and transmit to the ring 12 the combined static and the dynamic pressure of the fluid passing through space 16. The ring 12 is connected by a nipple 17 to a sylphon bellows 18 placed in a pressure-tight chamber 19 rigidly attached to the side of the induction pipe 11. A rod 20 is connected at its top to a plate 21 held against the lower surface of the bellows 18 by the action of a spring 22, the lower end of said rod 20 passing through the bottom of chamber 19 and being hinge-connected at 23 to a lever 24 of a rotary valve 25 installed in the gas induction pipe 11. The bottom of the gas induction pipe 11 has any type of discharge nozzle 26 for the introduction and distribution of high pressure gas from the gas induction pipe 11 into said annular oil space 16 which is supplied with oil from the oil-producing formation. To prevent the accumulation of pressure in the chamber 19 around the bellows 18, which pressure would interfere with the action of the bellows, rod 20 is welded at 27 to a small sylphon bellows 28 sealed on chamber 19 and adapted to expand and contract as the rod 20 is moved by the bellows 18.

The device functions as follows:

Assuming that at the beginning of the gas-lift operation a relatively high column of oil exists in the annular space 16, the head creates a relatively high static pressure in the sylphon bellows 18, as transmitted thereto by Pitot tubes 13, annular ring 12 and nipple 17. This increased static pressure expands the sylphon bellows 18 against the tension in the spring 22, pushes the rod 20 downwardly and actuates the lever 24 to open the rotary valve 25, thus introducing high pressure gas from the induction pipe 11 through the nozzles 26 and into the oil in the annular space 16. As soon as the introduced gas begins to lighten the column of oil and gas in said annular space by discharge of a portion of the oil from the top of the casing, the static pressure transmitted to the sylphon bellows 18 starts dropping and said bellows 18 partially collapses, thus raising the rod 20, rotating valve 25 and throttling down the amount of high pressure gas discharged through nozzles 26. Now, as stated above, if the rate of oil entering into the annular space 16 suddenly increases, the static pressure does not change sufficiently, but the dynamic pressure of the oil mass moving against the openings 15 of the Pitot tubes 13 increases materially. Therefore, the passage of such a mass or slug of oil increases the pressure in the sylphon bellows 18 and causes the rotary valve 25 to open somewhat and introduce a greater volume of high pressure gas into said annular space 16. As soon as said slug of oil has passed by the Pitot tube openings 15, the dynamic pressure again drops and again throttles valve 25 to maintain the desired gas-oil ratio. If a slug of liquid of greater density enters the annular space 16, the dynamic pressure immediately increases, thus opening valve 25 and introducing an excess quantity of high pressure gas to prevent retardation of flow. By providing a spring 22 of proper tension it is possible to regulate and maintain a constant gas-oil ratio in the flow pipe as long as the density of the liquid entering thereinto remains constant, and it is also possible to change said gas-oil ratio in response to changes in density, since the opening or closing of the valve 25 is determined by the degree of expansion of the sylphon bellows 18 which, in turn, depends on the summation of static and dynamic pressures in the annular space 16 and on the tension of the spring 22.

Sometimes, as in the case where the casing is too large or where the rate of oil flow is comparatively small, it is advantageous to reverse the flow so that the casing is used for the introduction of high pressure gas, while the tube depending therein is used as a flow pipe. Such an arrangement is shown in Figs. 3 and 4, wherein the pipe 11a is the flow tube or eduction pipe and the regulating device is attached near its lower end. In this case the annular ring 12a is fixed on pipe 11a and is provided with a plurality of Pitot tubes 13a extending into pipe 11a and opening downward against the gas-oil stream. As in the other form, ring 12a is connected by nipple 17 with sylphon bellows 18 positioned in closed chamber 19 attached to the outer wall of eduction pipe 11a, the bellows operating against the action of the spring 22 to actuate rod 20, the other end of which in turn actuates lever 24 and valve 25. The valve 25 is positioned in a gas pipe 31 provided with a long section 32 extending upwardly within the annular space 16a to position its upper intake end 34 above the level of the oil surging within the well casing. The other end of pipe 31 extends within eduction tube 11a and is equipped with any form of discharge nozzle 33 directed upward with the stream. The operation of this arrangement is identical with that described in conjunction with Figs. 1 and 2, the Pitot tubes 13a transmitting the total pressure within the flow pipe 11a to the sylphon bellows 18 which by means of rod 20 operates lever 24 to control the amount of gas introduced from the annular space 16a through nozzle 33.

In wells where slugs of water frequently enter the eduction pipe it is sometimes necessary to maintain the gas in the casing at a higher pressure than the operating pressure required to lift the oil so as to be able to introduce gas into said eduction pipe under such higher pressure when entrance of said slugs of water occurs. In that case it is necessary to close the annular space between the outer casing and the flow tube, such a device being shown in Fig. 5. In this modification the outer casing 10 is provided with an annular beveled seat 35, while the eduction pipe 11a carries a beveled closure plate 36 held in place on said flow tube by locking means 37. With this arrangement it is possible to eliminate the long section of pipe attached to pipe 31 as well as to permit the maintenance of a high gas pressure in the annular space without driving the oil from the well back into the formation.

The above disclosures are to be considered not as limiting but merely as illustrative, since many variations which will be apparent to those skilled in the art may be made within the scope of the following claims.

I claim:

1. A gas-lift method comprising supplying a gas to a well and into the lower end of a fluid eduction pipe whereby liquid in the well is elevated through said tube, measuring directly the dynamic pressure and indirectly the density at the point of entry of liquid into said tube, and varying the rate of supply of gas to the eduction tube in response to changes in said measured dynamic pressure and density of the liquid entering said tube at the time of entry of different gravity liquid into the tube, whereby a constant gas-oil ratio is maintained in the eduction tube.

2. A method for maintaining a constant gas-oil ratio in a fluid eduction pipe of a gas-lift well including the steps of measuring direct by dynamic pressure in said pipe and automatically varying the supply of gas into said fluid eduction pipe in proportion to the variations in said measured dynamic pressure therein.

3. A gas-lift method for maintaining a constant gas-oil ratio in oil wells comprising applying gas under pressure to an eduction tube for discharging oil through the tube, continuously measuring in said tube the summation of static pressure indirectly and dynamic pressure directly, and continuously regulating the flow of gas into the tube in response to variations in the sum of said measured pressures.

4. In a gas-lift method for flowing oil wells through a fluid eduction pipe by introducing gas under pressure thereinto and maintaining a constant gas-oil ratio therein, the steps of automatically measuring at substantially the lower end of the eduction pipe indirectly the static pressure within said pipe and directly the dynamic pressure at said point of measurement, and of continuously controlling the flow of gas into said pipe in proportion to changes in the sum of said pressures.

5. A method for maintaining a constant gas-oil ratio comprising applying gas to an eduction pipe to lift liquid through said pipe, measuring substantially at the point of said gas introduction the static pressure of the liquid indirectly and the dynamic pressure thereof directly, and continuously regulating the flow of gas adjacent its point of introduction to the eduction pipe and in response to variations in both of said static and dynamic pressures.

6. In combination with a gas induction pipe and a fluid eduction pipe communicating with each other, means associated with said fluid eduction pipe responsive directly to the dynamic pressure therein and independent of the pressure in the gas induction pipe, and means operatively connected with the pressure responsive means to regulate the inflow of high pressure gas in direct proportion to the dynamic pressure in the eduction pipe.

7. A structure according to claim 6 wherein the responsive means and the regulating means are located at the lower end of the eduction pipe.

8. A gas-lift device comprising, in combination, a fluid eduction pipe connected at one end with a fluid supply, means associated with said pipe and responsive respectively indirectly and directly to static and dynamic pressures therein, means to supply gas to said pipe, a valve in the gas supply adjacent the point of introduction of gas into said eduction pipe, and means operatively connecting the pressure responsive means with said valve, said pressure responsive means thereby actuating said valve to maintain a substantially continuous inflow of gas into said pipe in response to the combined static and dynamic pressures in the pipe.

9. A gas-lift device comprising, in combination, a fluid eduction pipe connected at one end with a fluid supply, means associated with said pipe and responsive respectively, indirectly and directly to static and dynamic pressures therein, means to supply gas to said pipe, a valve in the gas supply adjacent the point of introduction of gas into said eduction pipe, and means operatively connected with the pressure responsive means to maintain a substantially continuous inflow of gas into said pipe in direct proportion to the combined static and dynamic pressures in the pipe.

10. In a gas-lift device, a gas induction and a fluid eduction pipe communicating with each other, means associated with said fluid eduction pipe and responsive respectively indirectly and directly to fluctuations in the static and dynamic pressures of fluid in the eduction pipe, a conduit to supply gas to said eduction pipe from said induction pipe, and means at the point of gas introduction into said eduction pipe and operatively connected with the pressure responsive means to regulate the rate of introduction of gas from the gas induction pipe in direct proportion to fluctuations of both static and dynamic pressures in said eduction pipe and independently of variations of applied gas pressure.

11. In combination with a gas induction pipe and a fluid eduction pipe communicating with each other, a Pitot tube associated with said fluid eduction pipe and responsive to both the static and dynamic pressures therein, and means connected with the Pitot tube to regulate the inflow of high pressure gas in response to the combined static and dynamic pressure in the eduction pipe.

12. In a gas-lift device, a gas induction pipe and fluid eduction pipe communicating with each other, a Pitot tube arrangement responsive to fluctuations in the static and dynamic pressures in the lower portion of said eduction pipe, a valve to control flow of gas from the induction pipe to the eduction pipe, the valve being located near the point of gas introduction into said eduction pipe, and means operatively connected with said Pitot tube arrangement to regulate said valve to vary the introduction of gas into said eduction pipe in proportion to said fluctuations.

13. In combination with a gas induction pipe and a fluid eduction pipe communicating with each other, a Pitot tube arrangement adjacent the lower end of said eduction pipe and responsive to the fluctuations in static pressure therewithin and to dynamic pressure at said Pitot tube, a conduit opening from the gas induction pipe into the fluid eduction pipe, a valve on said conduit, and a mechanical connection between the Pitot tube and the valve to regulate the introduction of gas through said valve and into said eduction pipe in proportion to fluctuations in total pressure transmitted by said Pitot tube.

14. In a well flowing by gas-lift, a device for maintaining a constant gas-oil ratio as long as the liquid flowing therethrough remains of a substantially constant density and for changing said gas-oil ratio in proportion to changes in said density, comprising a fluid eduction pipe, means to supply gas under pressure to said pipe, a Pitot tube arrangement opening into said eduction pipe and pointing against the stream therein, means actuable by said Pitot tube arrangement, and a valve at the point of gas introduction into said eduction pipe operatively connected with and controlled by said actuable means to vary the rate of gas introduction into said pipe in proportion to variations in both static and dynamic pressures.

15. In combination with a well casing, a flow tubing depending therein, closure means adjacent the lower end of the tubing to close the annular space between the casing and tubing, a Pitot tube located above the closure means and opening into the tubing, means actuable by said Pitot tube, and a valve above said closure means and controlled by said actuable means to vary the rate of gas introduction into said tubing in proportion to variations in total pressure therein.

PHILIP SUBKOW.

CERTIFICATE OF CORRECTION.

Patent No. 1,981,477.  November 20, 1934.

PHILIP SUBKOW.

It is hereby certified that error appears in the printed specification of the above numbered patent requiring correction as follows: Page 4, line 23, claim 2, for "direct by" read directly; and that the said Letters Patent should be read with this correction therein that the same may conform to the record of the case in the Patent Office.

Signed and sealed this 8th day of January, A. D. 1935.

(Seal)
Leslie Frazer
Acting Commissioner of Patents.

said gas-oil ratio in proportion to changes in said density, comprising a fluid eduction pipe, means to supply gas under pressure to said pipe, a Pitot tube arrangement opening into said eduction pipe and pointing against the stream therein, means actuable by said Pitot tube arrangement, and a valve at the point of gas introduction into said eduction pipe operatively connected with and controlled by said actuable means to vary the rate of gas introduction into said pipe in proportion to variations in both static and dynamic pressures.

15. In combination with a well casing, a flow tubing depending therein, closure means adjacent the lower end of the tubing to close the annular space between the casing and tubing, a Pitot tube located above the closure means and opening into the tubing, means actuable by said Pitot tube, and a valve above said closure means and controlled by said actuable means to vary the rate of gas introduction into said tubing in proportion to variations in total pressure therein.

PHILIP SUBKOW.

CERTIFICATE OF CORRECTION.

Patent No. 1,981,477.      November 20, 1934.

PHILIP SUBKOW.

It is hereby certified that error appears in the printed specification of the above numbered patent requiring correction as follows: Page 4, line 23, claim 2, for "direct by" read directly; and that the said Letters Patent should be read with this correction therein that the same may conform to the record of the case in the Patent Office.

Signed and sealed this 8th day of January, A. D. 1935.

(Seal)      Leslie Frazer
Acting Commissioner of Patents.